US012672613B2

(12) United States Patent
Paul

(10) Patent No.: US 12,672,613 B2
(45) Date of Patent: Jul. 7, 2026

(54) SYSTEM AND METHOD FOR ON-DEMAND INSULATION

(71) Applicant: Alexander Paul, Beaverton, OR (US)

(72) Inventor: Alexander Paul, Beaverton, OR (US)

( * ) Notice: Subject to any disclaimer, the term of this patent is extended or adjusted under 35 U.S.C. 154(b) by 829 days.

(21) Appl. No.: 17/520,678

(22) Filed: Nov. 7, 2021

(65) Prior Publication Data

US 2024/0172602 A1 May 30, 2024

(51) Int. Cl.
| | |
|---|---|
| *A01G 9/24* | (2006.01) |
| *A01G 9/22* | (2006.01) |
| *E04B 1/343* | (2006.01) |

(52) U.S. Cl.
CPC .............. *A01G 9/24* (2013.01); *A01G 9/222* (2013.01); *A01G 9/225* (2013.01); *A01G 9/227* (2013.01); *E04B 1/343* (2013.01)

(58) Field of Classification Search
CPC ........ A01G 9/225; A01G 9/227; A01G 9/222; A01G 9/24; E04B 1/14; E04B 1/343; E04B 1/7608; E04B 1/80; E04B 2001/742; E04B 2001/7691; E04B 2001/7695; E04B 2001/8461
See application file for complete search history.

(56) References Cited

U.S. PATENT DOCUMENTS

| | | | | | |
|---|---|---|---|---|---|
| 4,290,242 A | * | 9/1981 | Gregory, Jr. | ........... | A01G 9/225 47/17 |
| 4,301,626 A | * | 11/1981 | Davis | ..................... | A01G 9/225 52/22 |
| 4,318,251 A | * | 3/1982 | Winkler | ................. | A01G 9/225 52/2.21 |
| 6,000,170 A | * | 12/1999 | Davis | ..................... | A01G 9/243 52/173.3 |
| 6,442,903 B1 | * | 9/2002 | Hebert | ................... | A01G 9/225 47/29.1 |
| 8,915,015 B1 | * | 12/2014 | Augspurger | ............. | A01G 9/14 47/17 |
| 10,499,570 B2 | * | 12/2019 | Lv | .......................... | A01G 9/225 |
| 2003/0070353 A1 | * | 4/2003 | Mercurio | ............... | A01G 9/227 47/17 |
| 2007/0227530 A1 | * | 10/2007 | Bayne | ................... | A01G 9/1415 126/621 |
| 2010/0058672 A1 | * | 3/2010 | Bayne | .................... | A01G 9/241 52/2.11 |
| 2015/0353379 A1 | * | 12/2015 | Lee | ...................... | B01D 1/0035 203/21 |
| 2022/0256778 A1 | * | 8/2022 | Santiago | ................ | A01G 9/227 |
| 2024/0172602 A1 | * | 5/2024 | Paul | .......................... | E04B 1/80 |

* cited by examiner

*Primary Examiner* — Andrew J Triggs

(74) *Attorney, Agent, or Firm* — Ryan Loveless

(57) ABSTRACT

An on-demand thermal insulator system has a a body that is configured to transition between a collapsed form non-deployed state and a deployed state. The body while in the non-deployed state allows a transfer of thermal energy through a defined boundary. The body while in the deployed state in resisting the transfer of thermal energy resists transfer through the defined boundary. In particular configurations, the body has a layer disposed between two material that receives fluid when transitioning from the non-deployed state to the deployed state.

19 Claims, 17 Drawing Sheets

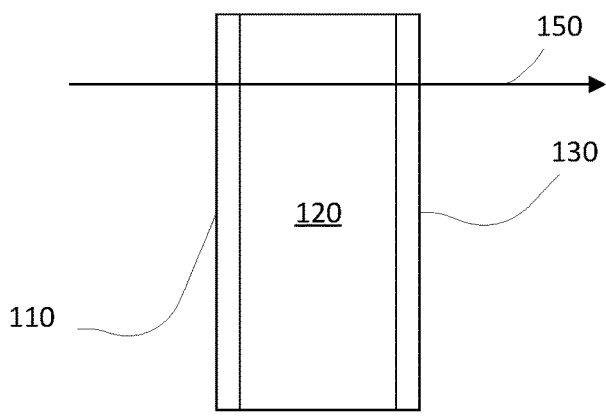
*FIG. 1*
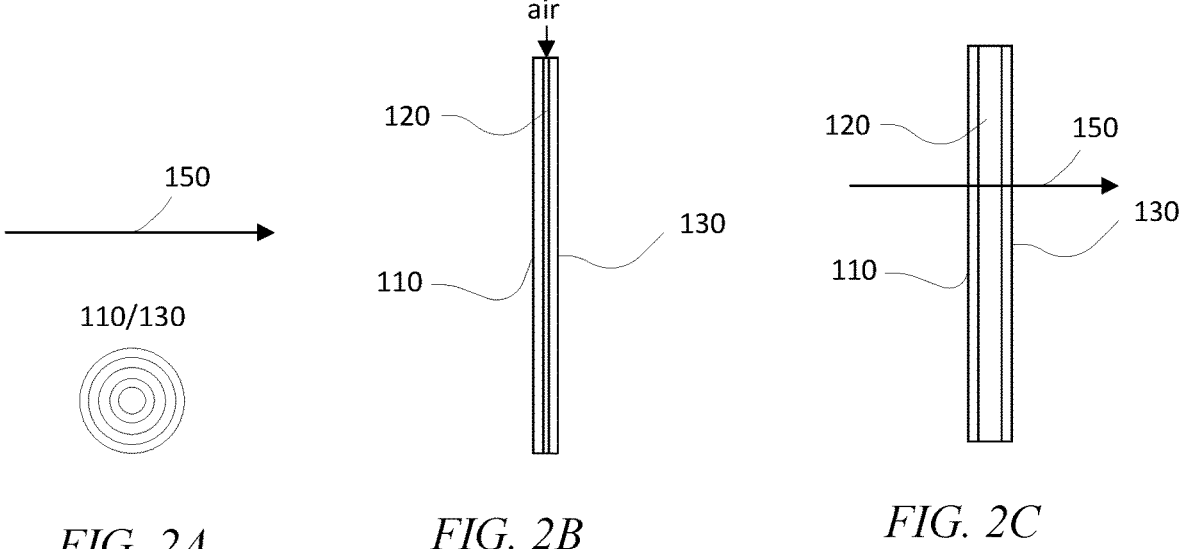
*FIG. 2A*        *FIG. 2B*        *FIG. 2C*

1890A
1890B
1890C
1890D
1890E
1890F
1890G
1890H

SYSTEM AND METHOD FOR ON-DEMAND INSULATION

TECHNICAL FIELD

This disclosure is generally directed to insulation. More specifically, this disclosure is directed to a system and method for on-demand insulation.

BACKGROUND

Insulative materials having air layers have conventionally been used, for example, in double-paned windows and stainless-steel containers (sold under the THERMOS brand). However, such conventional uses of materials are prohibitive in a variety of settings due, for example, to the costs involved and lack of flexibility in design for the materials creating the air-layer. Also, in a variety of settings, the insulating air-layer may not also be desired all the time.

SUMMARY OF THE DISCLOSURE

The present disclosure is directed to a new and improved system and method for on-demand insulation. An on-demand thermal insulator system has a body that is configured to transition between a collapsed form non-deployed state and a deployed state. The body while in the non-deployed state allows a transfer of thermal energy through a defined boundary. The body while in the deployed state in resisting the transfer of thermal energy resists transfer through the defined boundary. In particular configurations, the body has a layer disposed between two material that receives fluid when transitioning from the non-deployed state to the deployed state.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

BRIEF DESCRIPTION OF THE DRAWINGS

For a more complete understanding of this disclosure and its features, reference is now made to the following description, taken in conjunction with the accompanying drawings, in which:

FIG. 1 illustrates high-level principles, according to embodiments of the disclosure;

FIGS. 2A, 2B, and 2C illustrate high-level principles of an on-demand-layer, according to an embodiment of the disclosure;

DETAILED DESCRIPTION

Figures 3, 4A, 4B, 4C:
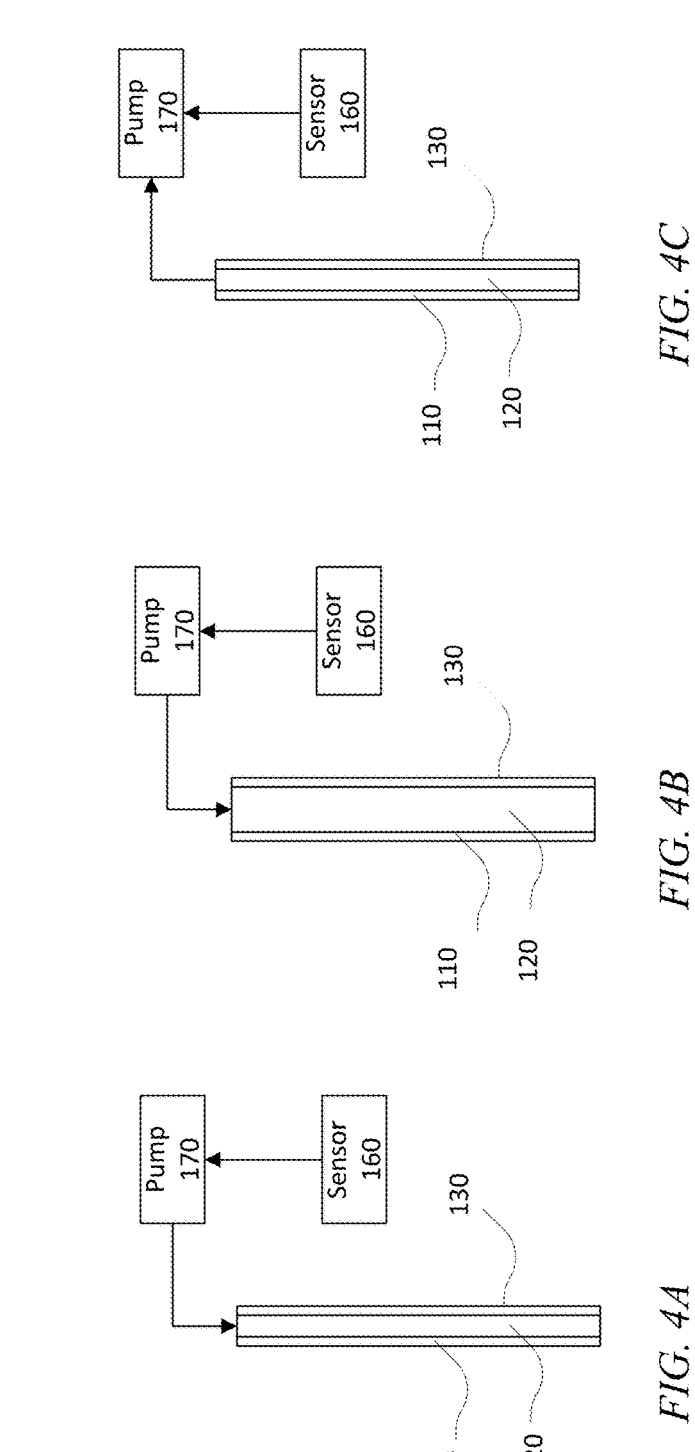
FIG. 3 shows a configuration having two air layers 120A/120B, according to an embodiment of the disclosure.
FIGS. 4A, 4B, and 4C shows a dynamic adjustment of the thickness of an air layer 120, according to an embodiment of the disclosure.

The Figures described below, and the various embodiments used to describe the principles of the present disclosure in this patent document are by way of illustration only and should not be construed in any way to limit the scope of the disclosure. Those skilled in the art will understand that the principles of the present disclosure invention may be implemented in any type of suitably arranged device or system. Additionally, the drawings are not necessarily drawn to scale.

Air layers, which have relatively poor thermal conductivity (and serve as insulators), are beneficially used in a variety of settings. However, creating such an air layer can be cost-prohibitive. And, the air layer may be undesirable for constant use. Accordingly, embodiments of the disclosure, provide an on-demand air-layer that can be used to selectively resist the transfer of thermal energy.

FIG. 1 illustrates high-level principles, according to embodiments of the disclosure. FIG. 1 shows an air-layer 120 between materials 110 and 130. The air-layer 120 has low thermal conductivity, for example, resisting the transfer 150 of thermal energy. Air layers have conventionally been used, for example, in double-paned windows and stainless-steel containers (sold under the THERMOS brand). However, such conventional uses of materials are prohibitive in a variety of settings due, for example, to the costs involved and lack of flexibility in design for the air-layer. Also, in a variety of settings, the insulating air-layer 120 may not also be desired all the time. Accordingly, certain embodiments of the disclosure provide an on-demand insulation layer (or layers) or on-demand thermal insulator While the term "air" is used herein, other gases may also be used in select configurations as will become apparent to one of ordinary skill in their art. Also, while air (or other gas) is described as being supplied for a layer or layers in certain configurations, other configurations may not utilize the air (or other gases) and instead may avail from the on-demand insulation features described herein. Moreover, while an on-demand feature is described, certain configurations described herein may have a semi-permanent or permanent state where there is no transition between one state and another. Further, while the term "layer" may be used, a layer may include multiple layers.

FIGS. 2A, 2B, and 2C illustrate high-level principles of an on-demand-layer, according to an embodiment of the disclosure. In particular configurations, one or both of the sides of the materials is flexible; and the air can be added during deployment—either as the air layer is moving towards its placement or after it's been put in a desired place.

As a non-limiting example, FIG. 2A shows materials 110/130 wound in a non-deployed state. While in the non-deployed state, a transfer 150 of thermal energy has less resistance. This is because the thermal energy is not interrupted by the air layer 120. While "wrapping" is shown in FIG. 2A as one technique for storing materials 110/130 in one configuration, any of a variety of configurations can be used where the materials 110/130 start with one shape and are transformed into another shape. Another non-limiting example is folding. Other examples will be described below.

FIG. 2B shows the materials 110/130 transforming to a deployed state. In this figure, the materials 110/130 are unwound. Air is also supplied to expand a volume for the air layer 120. Air is preferred in particular configurations because of its bountiful supply in the atmosphere: however, other fluids and or fluid combinations may be used. As will be recognized by one of ordinary skill in the art, the term "fluid" encompasses both gas and liquid and should be interpreted as such in this application.

The volume for the air layer 120 in particular configurations may have a selective seal—allowing selective input and output of fluid, for example, to inflate or deflate the air layer 120.

In preferred configurations, the materials used to create the air layer have a flexibility that allows the air layer to start in one shape and then take on a variety of other shapes such as planar on non-planar surfaces. The materials may include, but are not limited to polyvinyl chloride (PVC), texture-reinforced urethane plastic, other plastic, or rubber. Further, in select configurations, one or both of the materials may also have any suitable fabric that may resist puncturing.

FIG. 2C shows a deployed state where the volume for the air layer 120 has been expanded. In this deployed state, a transfer 150 of thermal energy is resisted—using the air layer 120 just created (in addition to the materials). In some configurations, the supplying of air may be viewed principally serving a purpose of creating a desired thickness of air layer 120. In particular applications, the thickness of the layer is dynamically adjustable based on a desired level of insulation. Also, again, while one air layer is generally shown, multiple air layers may be used in other configurations. Examples are described with reference to other figures herein.

After deployment, when the particular resistance to the transfer 150 of thermal energy is no longer desired, the air can be removed from the air layer 120 and the material 110/130 can be transformed back into the non-deployed state, for example, FIG. 2A. Such allows an on-demand insulation layer.

In the transformation between the deployed state and the non-deployed, a variety of mechanisms may be utilized. And, for such transformation, the force of the air may be used as part of the force to deploy the materials 110/130 into position. Biasing mechanism such as torsion springs, motors, and the like may also be utilized to transfer between states. Further details are described herein with reference to other figures.

FIG. 3 shows a configuration having two air layers 120A/120B, according to an embodiment of the disclosure. Layer 120A is positioned between material 110 and 130A: and air layer 120B is positioned between materials 130A/130B. While two layers are shown in this configuration, three or more air layers may be used in other configurations.

FIGS. 4A, 4B, and 4C shows a dynamic adjustment of the thickness of an air layer 120, according to an embodiment of the disclosure. With reference to FIG. 4A, a measurement is taken of thermal energy (e.g., temperature) using a sensor 160. If additional insulation is desired, a pump or other mechanism supplies air to the volume of the air layer 120 to increase its distance between the materials 110/130, for example as seen in FIG. 4B. When less insulation is desired (e.g., as determined from readings from sensor 160), the pump removes air 170 as shown in FIG. 4C.

Figure 5A:
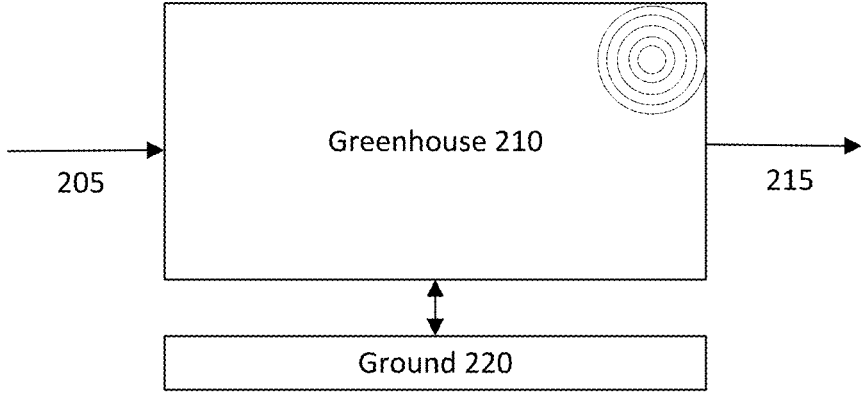
FIGS. 5A and 5B shows a schematic of a non-limiting example application of an on-demand deployment of insulation, according to an embodiment of the disclosure.
Figure 5B:
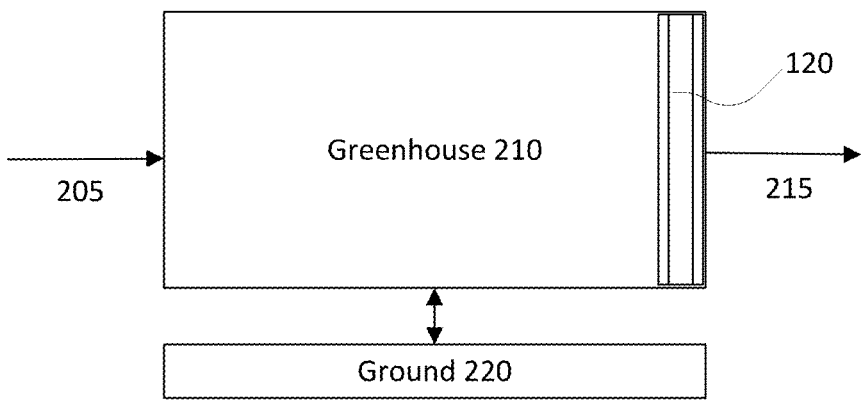

FIGS. 5A and 5B shows a schematic of a non-limiting example application of an on-demand deployment of insulation, according to an embodiment of the disclosure. In particular, FIGS. 5A and 5B show an on-demand deployment of insulation with reference to a greenhouse 210.

The greenhouse 210 receives both light and thermal energy (both generally represented by arrow 205) from the sun. Because the light is important to the photosynthetic growth inside the greenhouse, typical greenhouses have walls and roofs made of transparent glass or transparent plastic materials. Operationally, during the day, visible light from the sun has shorter wavelengths that pass through the transparent material whereas reflected infrared light (e.g., from inside the greenhouse) have longer wavelengths that are reflected and not allowed to escape—keeping the greenhouse warmer during the day.

The vegetation inside the greenhouse 210 usually has a preferred range of temperatures for growth. To keep the temperature inside the greenhouse within a preferred range of temperature, in some operations, greenhouse 210 interacts with the fairly constant temperature provided by ground 220. This is especially true in cold environments where nighttime temperatures drop below 35 degrees F. At a depth of 10 ft, the ground 220 is roughly 55 degrees. Accordingly, tapping into the ground 220 using a pipe, air warmed by the ground can be blown into the greenhouse 210.

At nighttime, the thermal energy 215 lost from the greenhouse becomes a concern because of the lack of incoming light and thermal energy 205 from the sun. This is especially true when a large temperature difference exists between the inside of the greenhouse and ambient temperature. As ambient temperatures outside drop further and further, the thermal energy from the ground 220 may not be sufficient to offset the loss of thermal energy 215 to the ambient environment.

Accordingly, with reference to FIG. 5B, the loss of thermal energy 215 is dissipated by deploying an on-demand barrier that uses an air gap 120 to resist the loss of thermal energy 215. For ease of illustration, this is only shown on one side of the schematic of FIGS. 5A and 5B. However, one of ordinary skill in the art will recognize that the air layer 120 can be established on-demand and on all surfaces through which the greenhouse 210 will exchange thermal energy 215 with the ambient environment. During the day, the on-demand air gap 120 can be in a non-deployed state (as indicated by the wound layers 110/120) in FIG. 5A. Such allows desired transmission from the sun. Then, at night (when the sun's benefit no longer exists), the on-demand air layer 120 can be deployed.

Figures 6A, 6B:
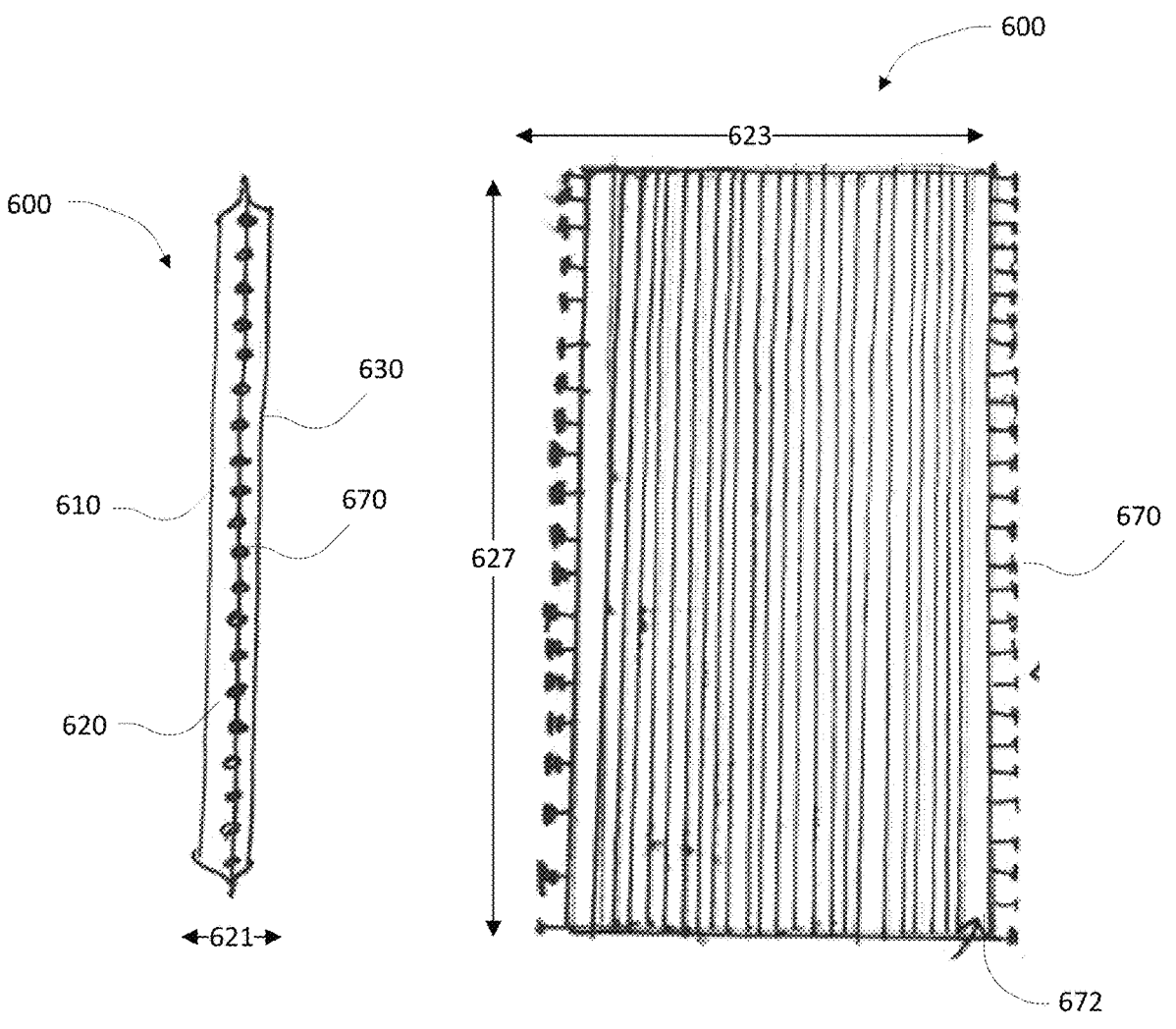
FIGS. 6A and 6B show an example of a panel that can be part of the deployment of on-demand insulation, according to an embodiment of the disclosure.

FIGS. 6A and 6B show an example of a panel 600 that can be part of the deployment of on-demand insulation, according to an embodiment of the disclosure.

FIG. 6A is a side view of the panel 600. As in other configurations, an air layer 620 is established between material 610 and 630. In particular configuration, the material 610 and 630 may be part of a bag or multiple bags and the deployment of the on-demand insulation is an inflation of a bag or bags (e.g., using air).

In particular configurations, a thickness 621 of the air layer 620 may be eight inches. In other configurations, the thickness 621 may be smaller than or larger than eight inches. And, as described in this specification, the thickness may be dynamically changeable in particular configurations.

Also shown in FIG. 6A are wheels 670 that guide deployment of the panel 600 during transition between states. In particular configurations, the wheels may also be used for folding of a panel 600. For example, alternating wheels can have differences to guide portion of the panel to different lower tracks that correspond to a folding.

FIG. 6B is a top view of the multi-bag panel 600 of FIG. 6A. A width 623 of the panel 600 may be 4 feet. A height 627 of the panel 600 may be 6 feet. However, larger or smaller widths 623 and heights 627 may be used in other configurations.

The edge of the panel 600 has a seam 672 to which the wheels 670 connect. In addition to guiding the deployment, the wheels 670 also are the structural connection point for the panel 600.

The panel 600 may have a common volume for the air layer 620; however, a variety of structural features may be used to keep the desired thickness 621—across the expanse from the structural connection point of the wheel 670. In particular configurations, the panel 600 may appear as multiple connected tubes with materials between each tubing—although in actually sharing the same sealed volume. While sharing the same volume in particular configurations, in other configurations, portions of the panel may not share the same volume. Also, a variety of other configurations may alternatively be used for structural support.

Figures 7A, 7B, 7C:
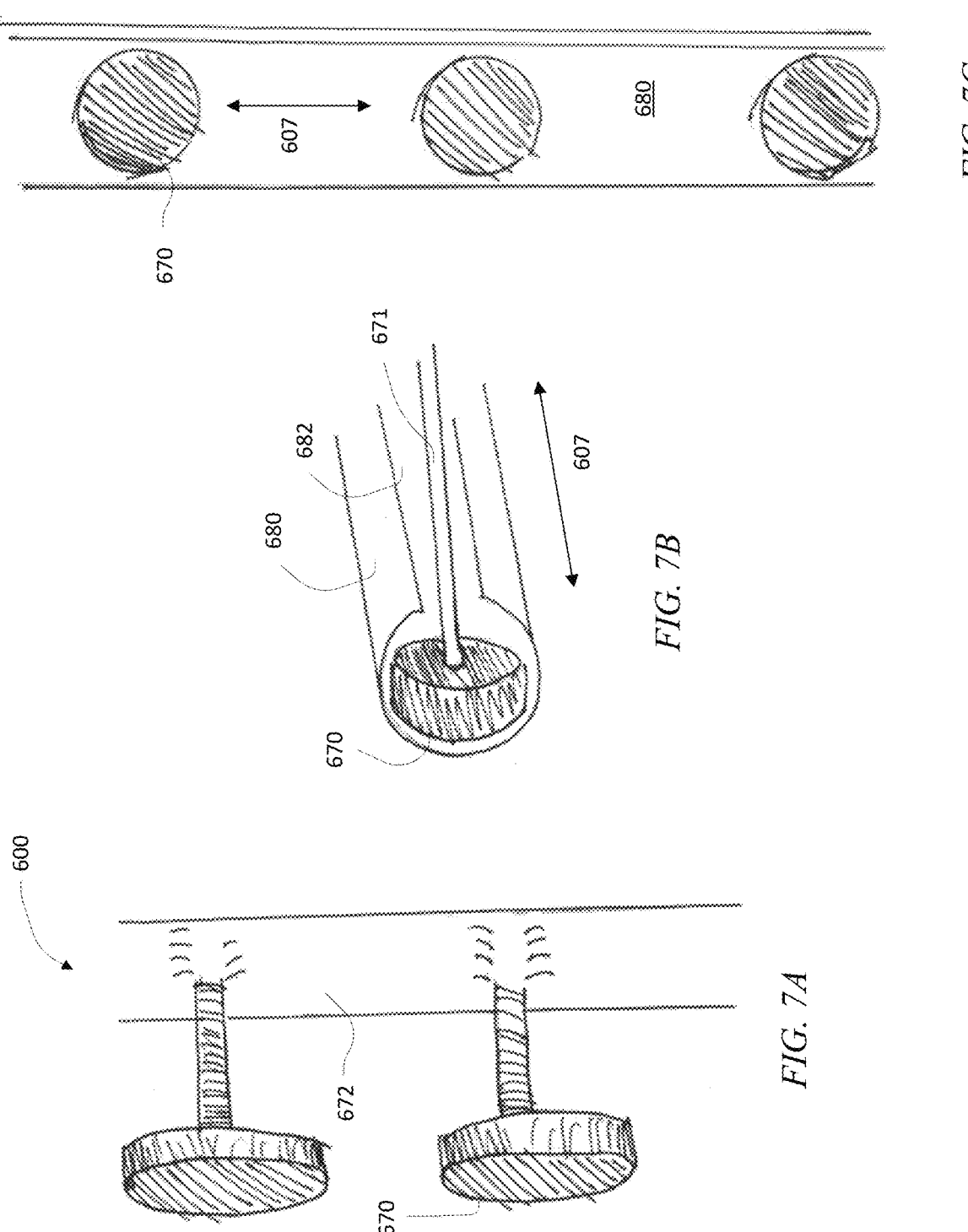
FIGS. 7A, 7B, and 7C show an example of a deployment track, according to an embodiment of the disclosure.

FIGS. 7A, 7B, and 7C show an example of a deployment track 680, according to an embodiment of the disclosure.

FIG. 7A shows a close-up of wheels 670 coupled to a seam 672 of the panel 600.

FIGS. 7B and 7C shows a deployment track 680 upon which the wheel 670 can traverse back and forth (e.g., arrows 607)—during transition between the deployed state and non-deployed state. The deployment track 680 has a cutout slot 682 for the axles 671 of the wheel 670.

The deployment track 680 may be a PVC pipe with a one-inch diameter. In other configurations, the deployment track may have a larger or smaller diameter and be made of other material. Additionally, other shapes may be used for the deployment track—including non-tubular shapes.

Figure 8:
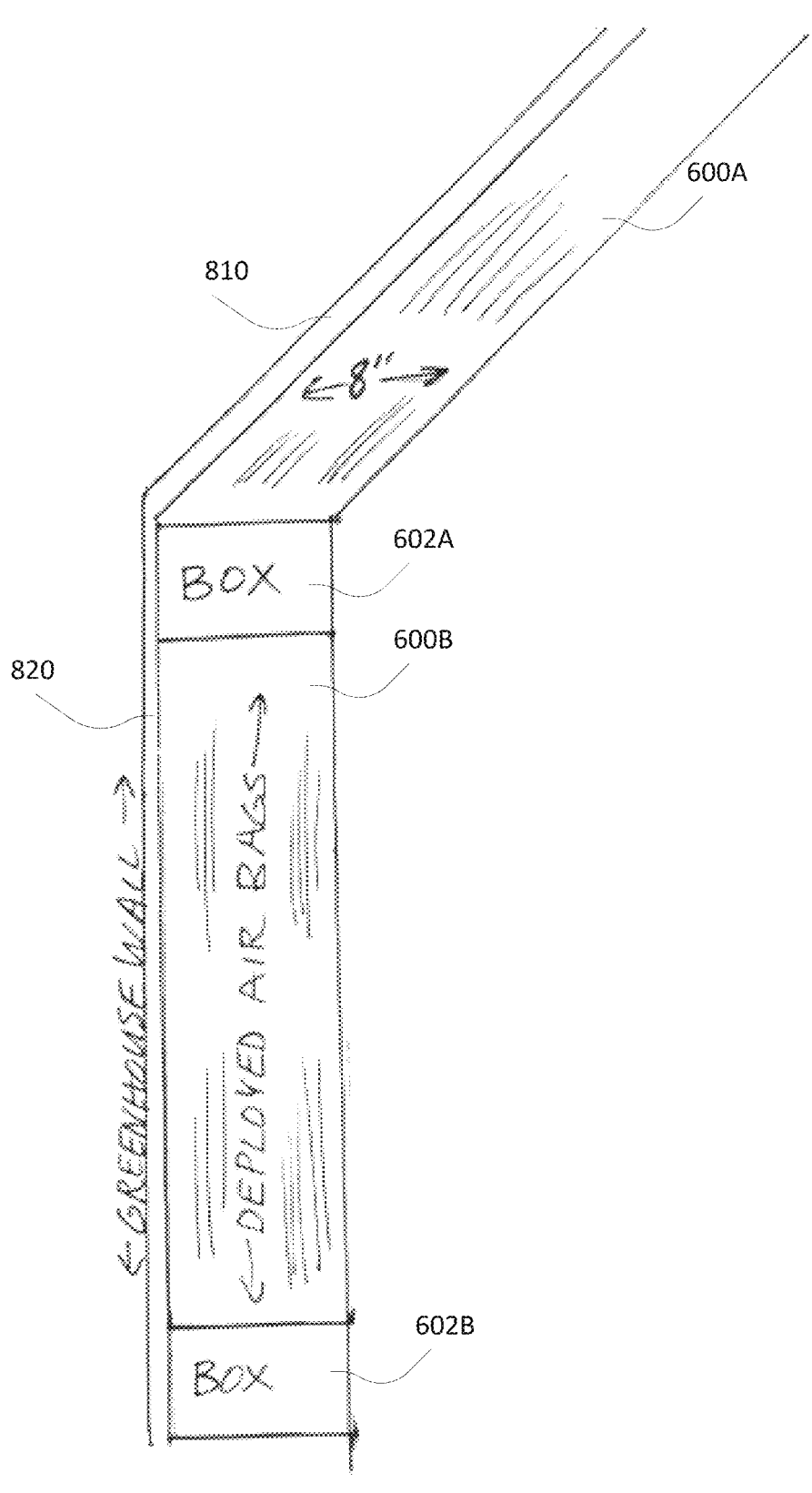
FIG. 8 shows an example deployment with respect to a wall and roof of a greenhouse, according to an embodiment of the disclosure.

FIG. 8 shows an example deployment with respect to a wall and roof of a greenhouse, according to an embodiment of the disclosure. The greenhouse has a roof 810 and a wall 820. A panel 600A has been deployed on the roof 810 and a panel 600B has been deployed on the wall 820. In this particular configuration, the air layer in the respective panels 600A and 600B may be 8 inches; however, in other configurations, the air layer may be more than or less than eight inches.

Prior to deployment, the panel 600A may be stored in box 602A and the panel 600B may be store in box 602B. Any of a variety of mechanisms may be used for deployment. Non-limiting examples are provided herein with reference to other figures.

Figure 9:
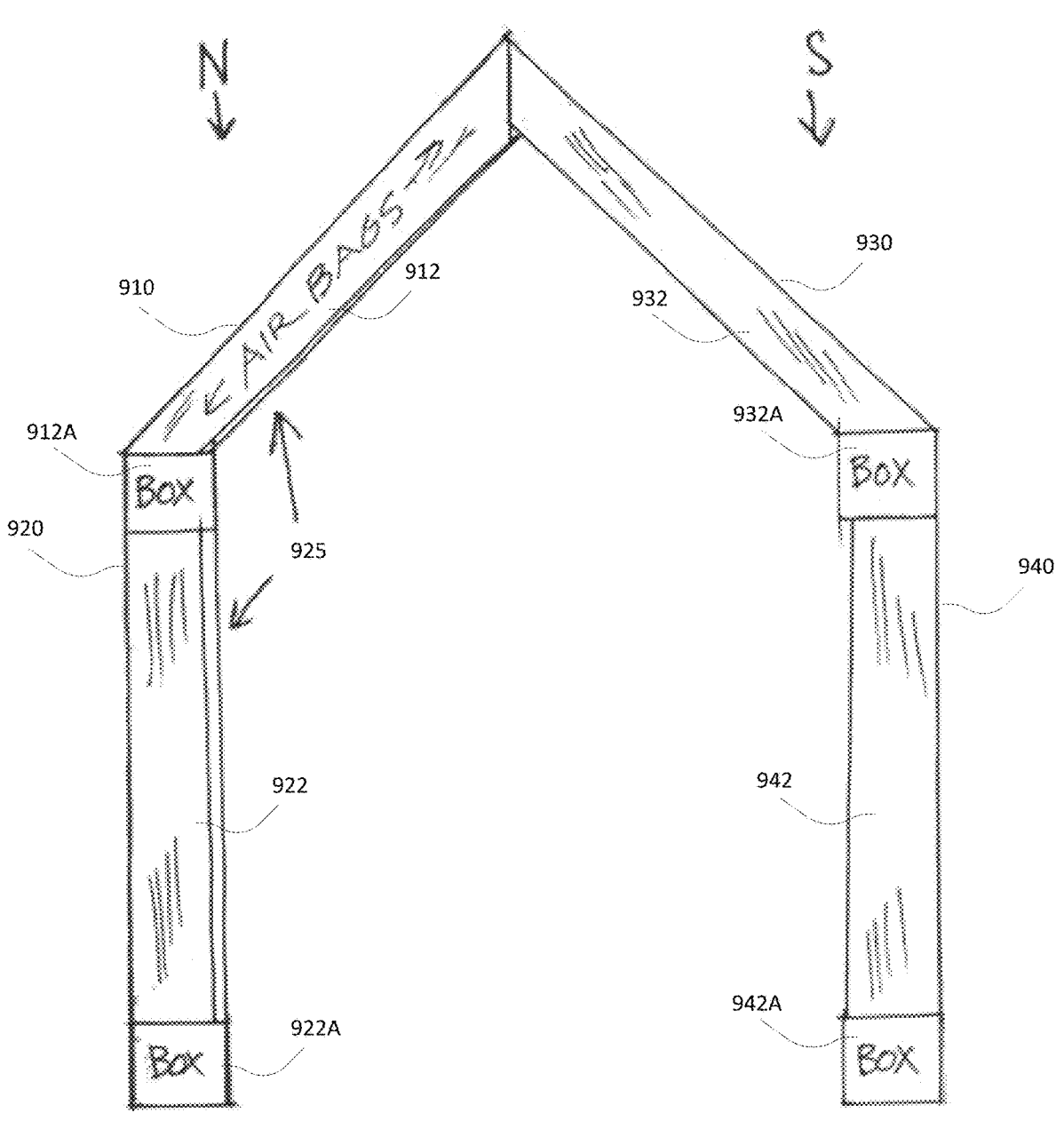
FIG. 9 shows another example deployment with respect to a wall and roof of a greenhouse, according to an embodiment of the disclosure.

FIG. 9 shows another example deployment with respect to a wall and roof of a greenhouse, according to an embodiment of the disclosure. A wall 920 and a roof 910 are generally aligned with the north side of a greenhouse whereas a wall 940 and a roof 930 are generally aligned with the south side of the greenhouse. Panels 912, 922, 932, and 942 are deployed from their respective boxes 912A, 922A, 932A, and 942A.

Being on the north wall, the panels 912 and 922 have liners 925 to reflect sunlight back to the vegetation. The liners 925 may have any suitable materials to reflect such sunlight including, but not limited, to being white colored. Operationally, the panels 912 and 922 may be permanent or semi-permanent whereas panels 932 and 942 are deployed at night and non-deployed during the day.

Figure 10A:
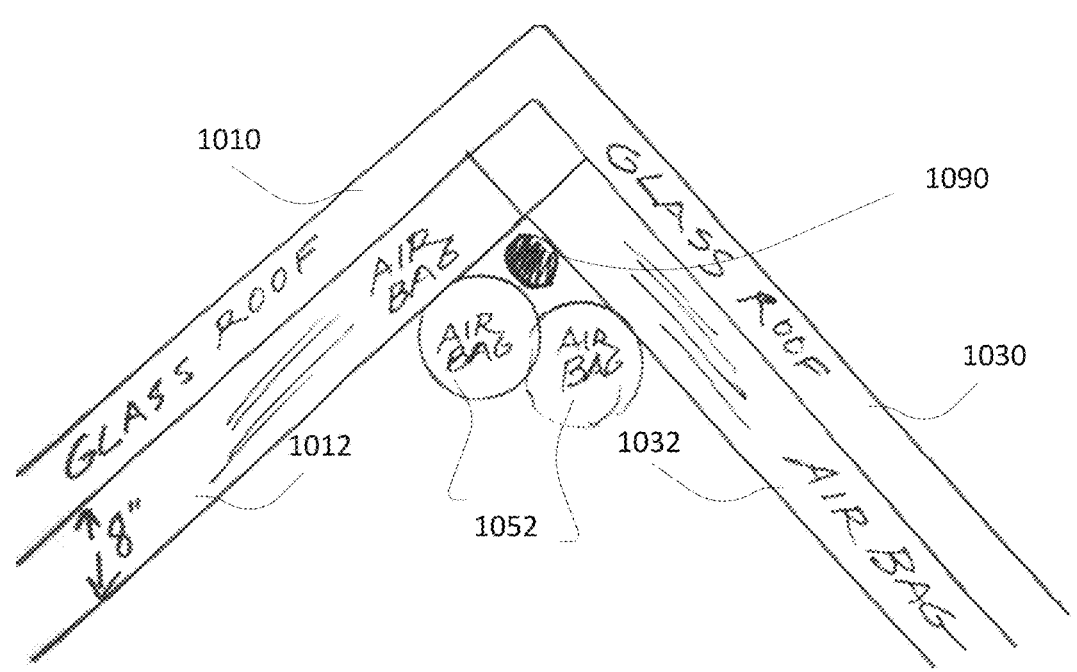
FIGS. 10A and 10B show an example connection between panels, according to an embodiment of the disclosure.
Figure 10B:
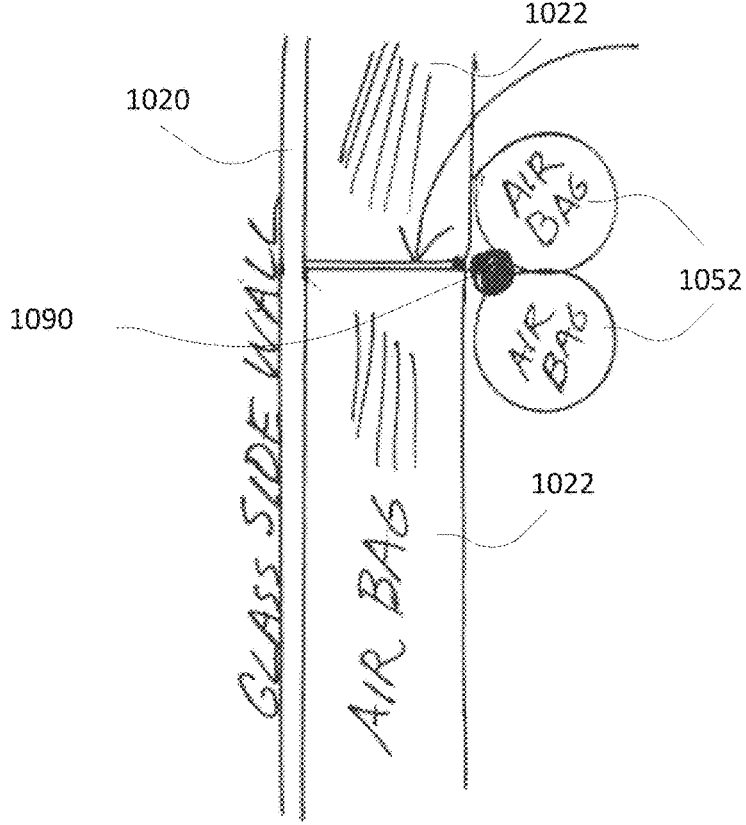

FIGS. 10A and 10B show an example connection between panels, according to an embodiment of the disclosure.

In FIG. 10A, panels 1012 are and 1032 are respectively deployed. Dot 1090 generally references piping that may be used to inflate the panels 1012, 1032 as well as equipment (e.g., mechanical equipment) used to pull up the panel 1012, 1032. Further details describing such piping an equipment are described herein with reference to other figures.

To insulate the interface between the panel 1012, 1032 as well as piping and equipment 1090, additional air layers 1052 are used. The additional layers 1052 may be shaped as bags or any other suitable shape to prevent thermal energy transfer leaks.

FIG. 10B shows a similar concept to the operation of FIG. 10A except with respect to the panels 1022 on a wall. In FIG. 10B, additional air layers 1052 are used at interfaces to prevent thermal energy transfer leaks between panels 1022 and, also, where piping and equipment may be located (e.g., as indicated by dot 1090).

Figure 11:
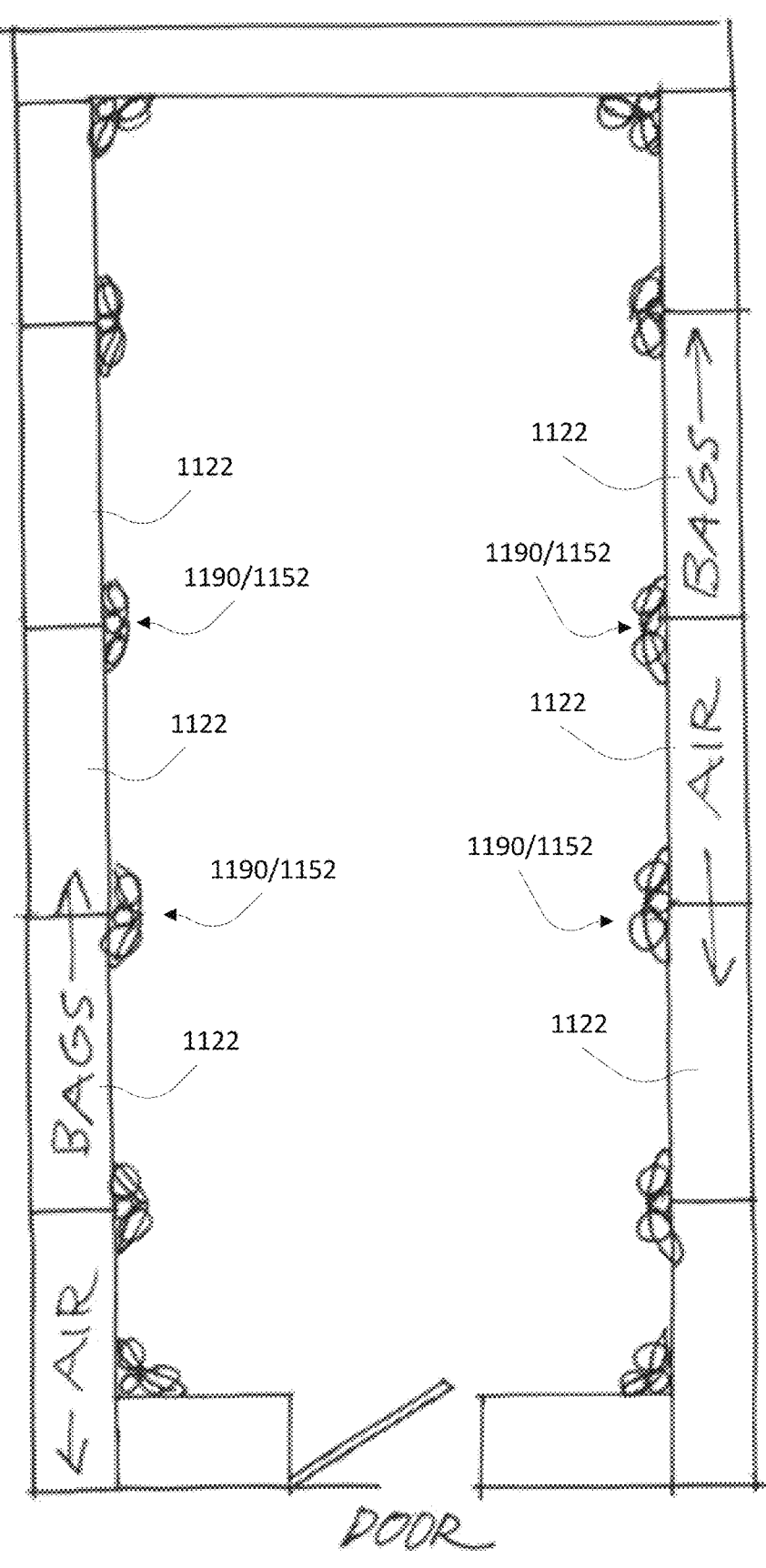
FIG. 11 is an overhead view of a greenhouse showing interfaces between panels.

FIG. 11 is an overhead view of a greenhouse showing interfaces between panels 1122. Similar to the description with reference to FIGS. 10A and 10B, interfaces between panels 1122 (which may also include piping and equipment 1190), additional layers 1152 may be used.

Figure 12:
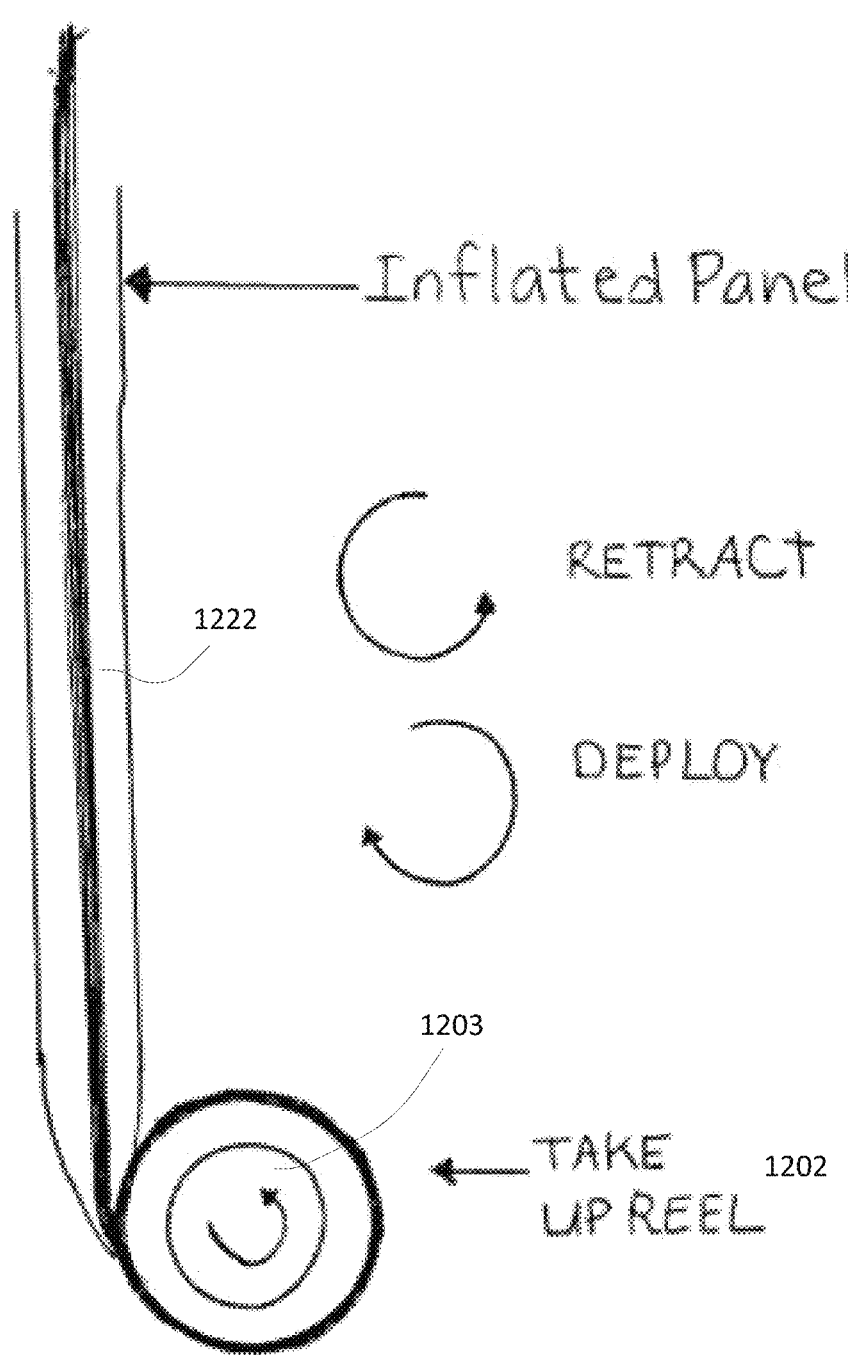
FIG. 12 shows a side view of a take up reel that may be utilized in particular configurations, according to an embodiment of the disclosure.

FIG. 12 shows a side view of a take up reel 1202 that may be utilized in particular configurations. The take up reel 1202 may generally correspond to, for example, the "boxes" referenced in other configuration for storage of the panel 1222 in a deflated state. The take up reel 1202 in this configuration includes a biasing mechanism 1203 that retracts the panel 1222 when not in use (e.g., in the deflated state). In some configurations, the biasing mechanism 1203 may be a mechanical motor. In other configurations, the biasing mechanism 1203 may be torsion springs or other types of springs that resist the deployment—constantly seeking to retract the panel 1222. In FIG. 12, the panel 1222 is inflated.

Figures 13A, 13B:
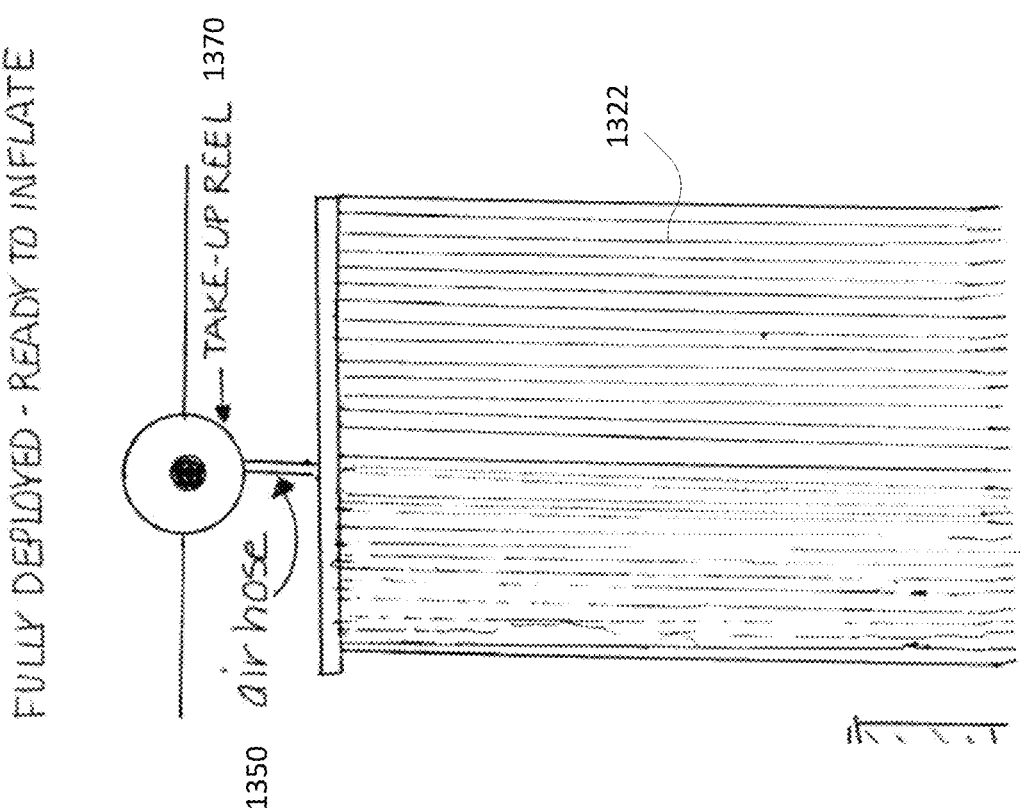
FIGS. 13A and 13B respectively shown examples of a partially deployed and fully deployed panel, according to an embodiment of the disclosure.

FIGS. 13A and 13B respectively shown examples of a partially deployed and fully deployed panel, according to an embodiment of the disclosure.

In FIG. 13A, a panel storage container 1302 (which is described as a "box" in other configurations) may generally hold the panel 1322 in the non-deployed or uninflated state. The storage of the panel 1322 may take on a variety of configurations—including winding around a reel, folding, or other suitable configurations.

The panel 1322 may be pulled from the panel storage container 1322 using a tension cord or any other suitable mechanism. In particular configurations, an air hose 1350 used to inflate the panel 1322 may double as a tension cord.

As seen in FIGS. 13A and 13B, a take up reel 1370 is pulling up the panel 1322. Any suitable biasing mechanism may be used for such a configuration. A non-limiting example includes a motor. The air hose 1350 supplies air to the panel 1322. This can either be done during removal from the panel storage container 1302 or after the panel is in potion.

Figure 14:
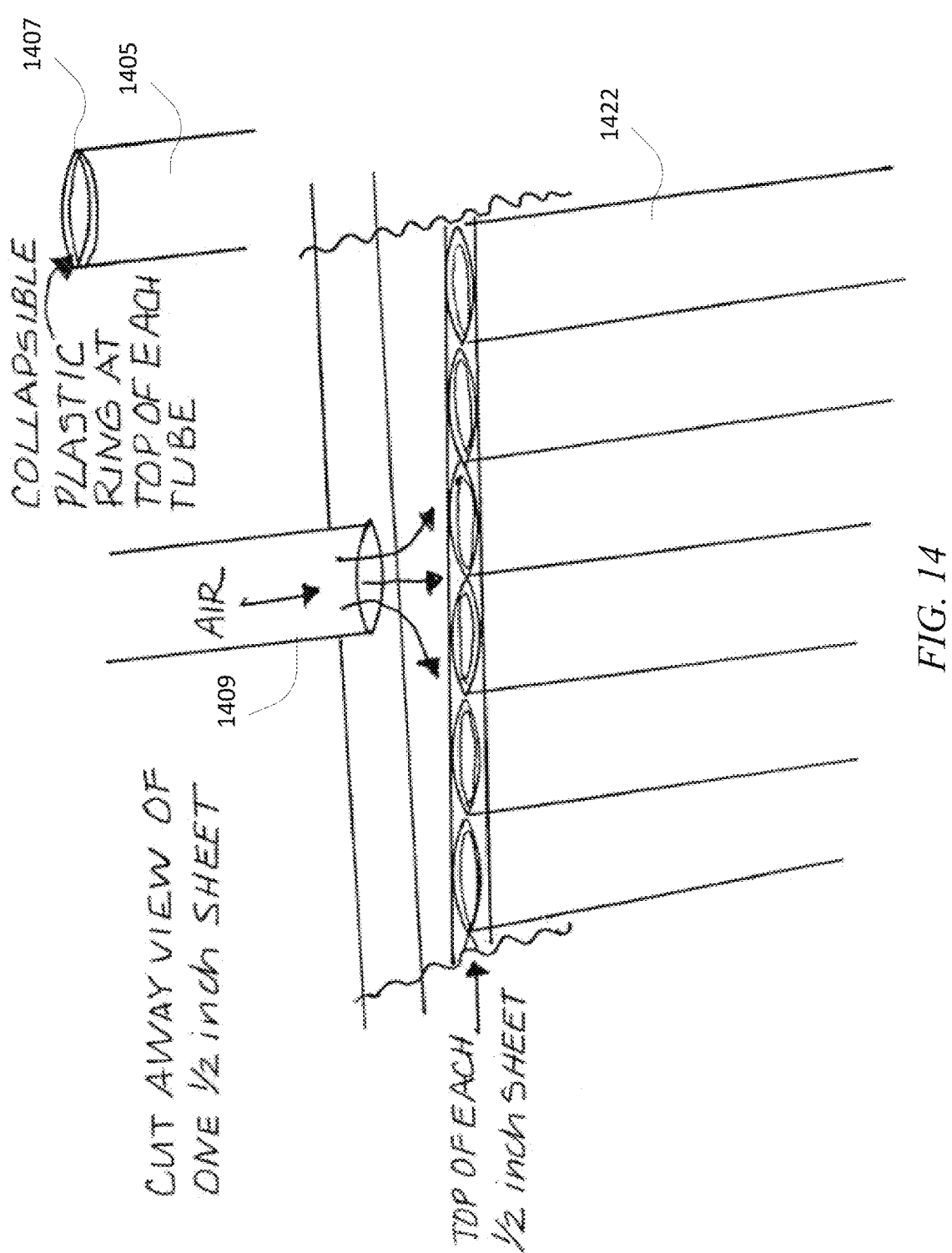
FIG. 14 shows an example inflation of a panel, according to an embodiment of the disclosure.

FIG. 14 shows an example inflation of a panel 1422, according to an embodiment of the disclosure. In particular, FIG. 14 shows a cut-away view of a plurality of tubes 1405 making up a layer of a panel 1422. Although the details of one layer of the panel is shown for ease of illustration, multiple layers may be used. A single air flow 1409 operates through a manifold (not shown) to fill up each of the tubes 1407 in the layer. In particular configurations, each layer can have its own respective single air flow 1409. In turn, the single air flows of each of the layers are connected to a manifold that connects each single air flow to a supply line. Although generally shown as separate in this configuration, the tubes 1405 and/or the panel 1422 may share the same volume at locations other than the manifold. At the top of each of the tubes 1402 is a collapsible ring 1407 that keeps the tubes open to allow air flow. In particular configurations, the tubes are ½ inch wide: however, in other configurations, the tubes may be larger or smaller in diameter. Where eight layers are used, the thickness for the on-demand insulation becomes 4 inches.

Figure 15B:
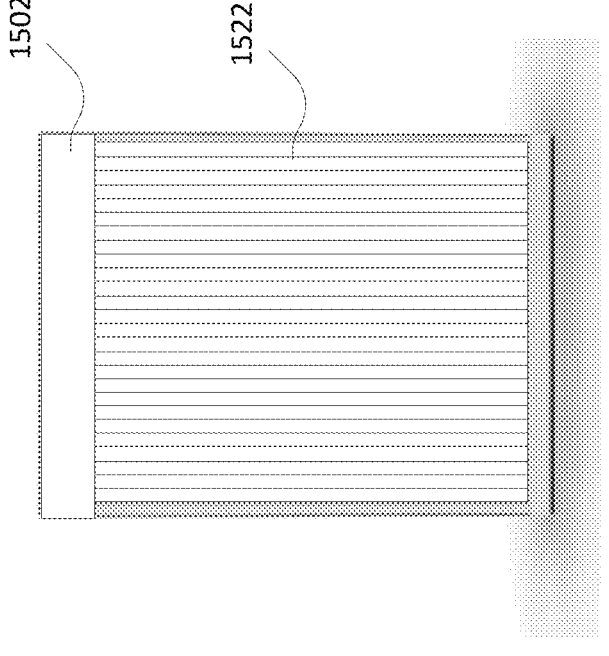
FIGS. 15A and 15B show an on-demand application of insulation for a window, according to an embodiment of the disclosure.
Figure 15A:
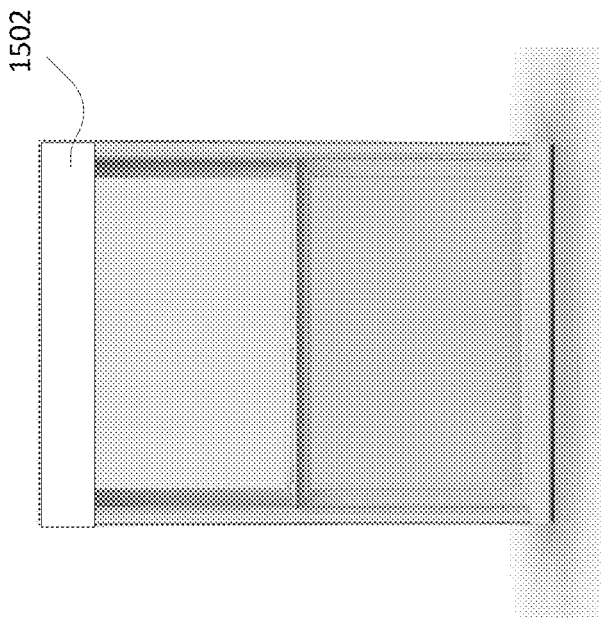

FIGS. 15A and 15B show an on-demand application of insulation for a window, according to an embodiment of the disclosure. A box 1502 much like the other boxes described herein stores the panel 1522, for example, on a spring loaded real that resists deployment. When deployed, the panel 1522 can be pulled over the window.

In particular configurations, the pulling down of the panel 1522 can be done in a similar manner to pulling down a window shade. Tracks may also be used in particular configurations as disclosed herein with reference to other figures.

A design such as that shown in FIGS. 15A and 15B can be used as a retrofit in existing window configurations. Alternatively, it can be built into the window.

Figure 16B:
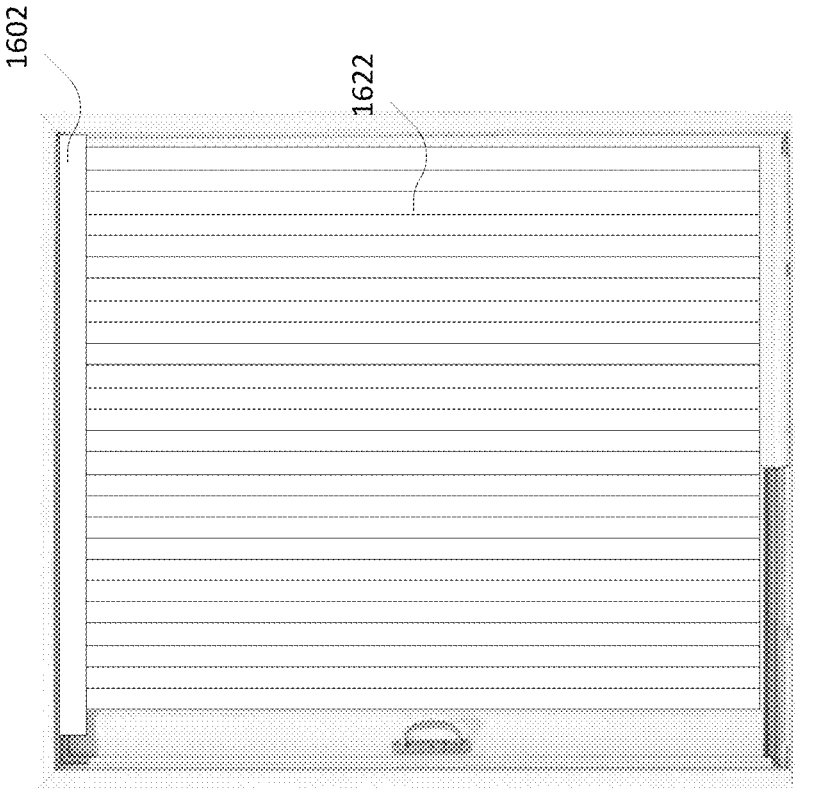
FIGS. 16A and 16B show an on-demand application of insulation for a door, according to an embodiment of the disclosure.
Figure 16A:

FIGS. 16A and 16B show an on-demand application of insulation for a door, according to an embodiment of the disclosure. In particular, the configuration for FIGS. 16A and 16B concerns a sliding door. Such a configuration operates in a similar manner to FIGS. 15A and 15 with a box 1602 and panel 1622.

FIGS. 15A, 15B, 16A, and 16B illustrate that the on-demand insulation can be placed in virtually any location where insulation is needed. Windows are a particularly good candidate because they provide desired sunlight during the day, but undesirably release thermal energy at nighttime.

Just like FIGS. 15A and 15B, the design of FIGS. 16A and 16 can be used as a retrofit in existing dooring configurations. Alternatively, it can be built into the doors.

Figure 17:
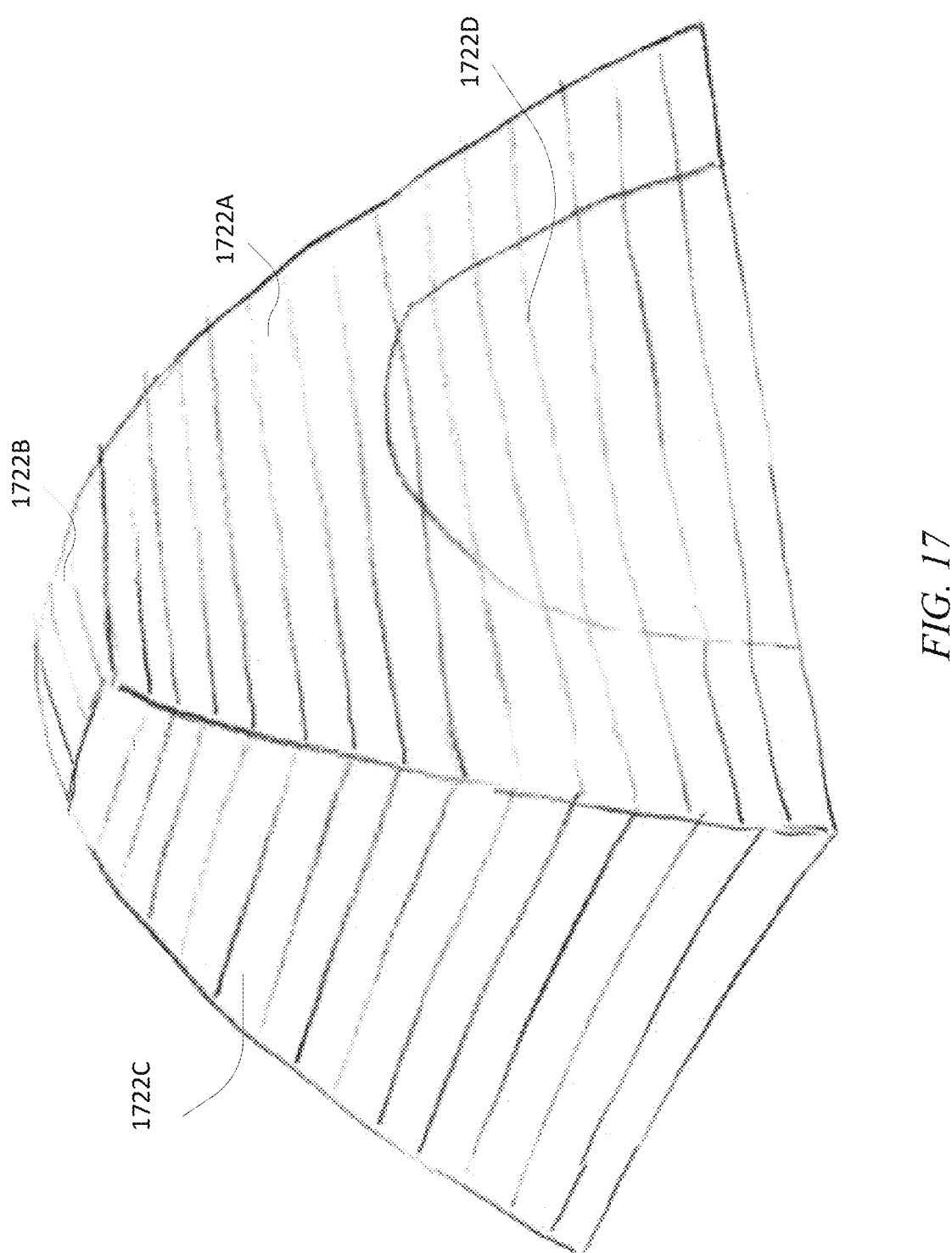
FIG. 17 shows an on-demand insulation application for use with a tent, according to an embodiment of the disclosure.

FIG. 17 shows an on-demand insulation application for use with a tent, according to an embodiment of the disclosure. In a variety of settings, the ambient temperature can get extremely low. Conventional tent materials either lack adequate insulation and/or are too bulky to easily move. Often, when a thermal energy source exists inside the tent, the thermal energy is quickly lost through the tent's materials to the cold ambient environment. Accordingly, panels 1722A, 1722B, 1722C, and 1722 D can be provided for tents using the same principles described with reference to other figures in the disclosure.

The panels 1722A, 1722B, 1722C, and 1722 D can either be embedded within a tent or retrofit existing tent designs. In particular configurations, the air pressure provided to the panels 1722A, 1722B, 1722C, and 1722 D can help set up the tent or provide some basic structural integrity to the tents design.

The door panel 1722D may have a separate volume then the corresponding front panel 1722A. Side and back panel 1722C may be several panels.

In supplying air pressure to the respective panels, a common conduit may be used. For example, air channels may traverse connection points between the panels. Alternatively, in other configurations, the panel may be supplied air separately and lack common fluid connection points. Although not seen from this configuration, additional air layers (e.g., 1052 in FIGS. 10A and 10B) may also be used inside the tent at the respective seems to inhibit the loss of thermal energy. As described in the other configurations, a particular panel may have several layers.

Figure 18:
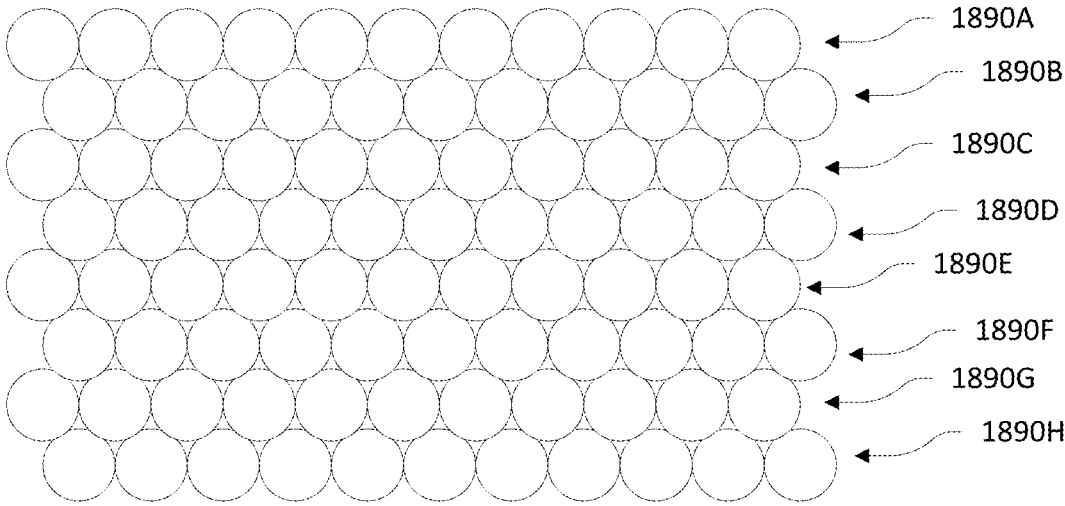
FIG. 18 shows an example of layering in particular configurations, according to an embodiment of the disclosure.

FIG. 18 shows an example of layering in particular configurations, according to an embodiment of the disclosure. In this figure eight layers 1890A through 1890H are shown. As shown, in particular configurations, the layers may be staggered. While eight layers are shown, less than or more than eight layers may be utilized.

In particular configurations, a common conduit can be connected, for example, to a manifold to fill up all the layers at the same time. Alternatively, each layer me separately filled. In particular configurations, the filling up of layers can dynamically change an effective distance across the material for a desired insulative effect. For example, more layers can be filled.

Figure 19:
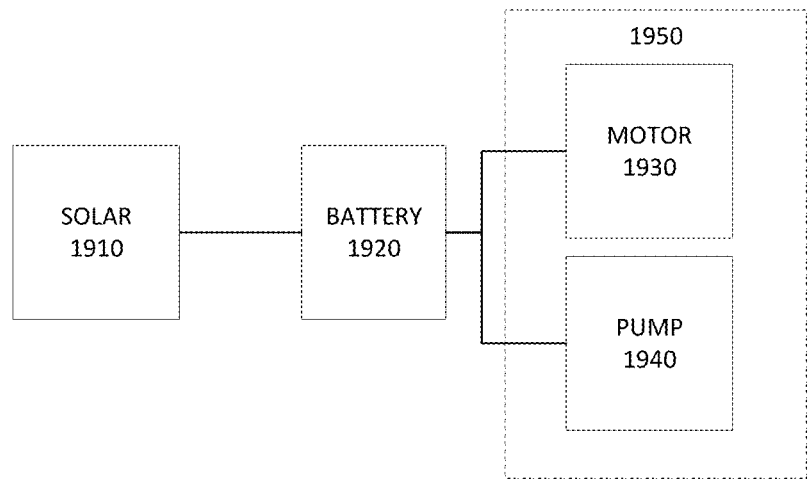
FIG. 19 shows an example of energy distribution, according to an embodiment of the disclosure.

FIG. 19 shows an example of energy distribution, according to an embodiment of the disclosure. A solar panel 1910 obtains energy from the sun and stores it in, for example, a battery 1920. When deploying indicated by box 1950, the motor 1930 and pump 1940 drain from the battery to move and inflate a panel. A configuration such as that shown in FIG. 19 is particularly useful in environments where sun exposure occurs during the day. Energy from the sun can be stored. While not shown, the battery 1920 may also be used to store other equipment.

Figure 20:
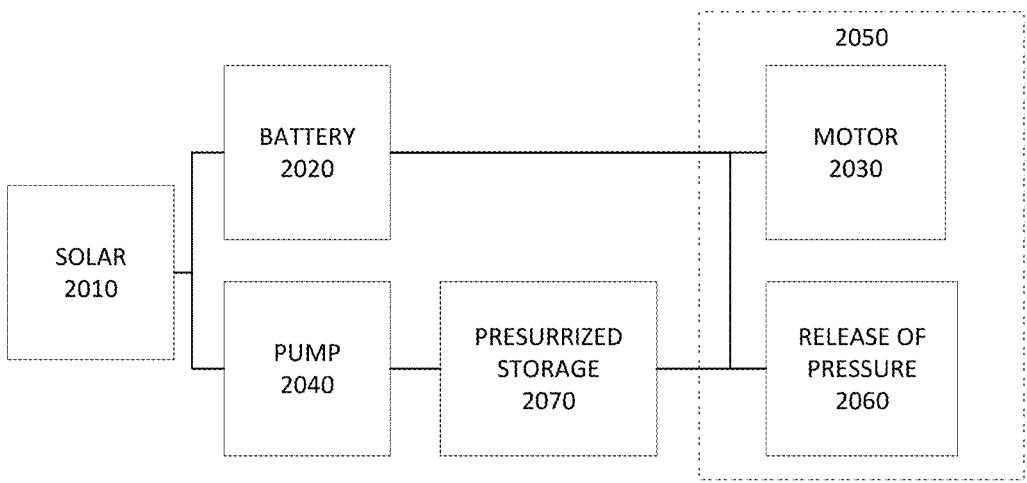
FIG. 20 shows another example of energy distribution, according to another embodiment of the disclosure.

FIG. 20 shows another example of energy distribution, according to another embodiment of the disclosure. FIG. 20 operates in a similar manner to FIG. 19 except that energy is stored as air pressure in pressurized storage 2070. This may be done during the day through energy from solar panel 2010 supplying energy to the pump 2040. When deploying indicated by box 2050, the motor 2030 and a release of pressure 2060 move and inflate a panel. In particular configurations, the pump 2040 may provide supplemental pressures as well.

While this disclosure has described certain embodiments and generally associated methods, alterations and permutations of these embodiments and methods will be apparent to those skilled in the art. As a non-limiting example, principles discussed with reference to one figure may be combined principles described with reference to another. Additionally, while particular specified uses of an on-demand insulator system has been provided, one of ordinary skill in the art will recognize that such an on-demand insulator system may be used in a variety of other setting. The above description of example embodiments does not define or constrain this disclosure. Other changes, substitutions, and alterations are also possible without departing from the spirit and scope of this disclosure, as defined by the following claims.

What is claimed is:

1. An on-demand thermal insulator system comprising:
a body configured to transition between a non-deployed state and a deployed state, the body configured to resist the transfer of thermal energy when in the deployed state and, when in the non-deployed state, is retracted to a first position from which the body is configured to traverse a guided path to a second, deployed position, wherein:
the body while in the deployed state is positioned against a defined boundary having transparent material through which light is configured to pass;
the body while in the deployed state resists the transfer of thermal energy through the defined boundary; and
the body while in the non-deployed state allows a transfer of thermal energy through the defined boundary; and
a track comprising a channel configured to receive wheels coupled to the body to actively guide the body's movement during deployment and retraction between the non-deployed state and the deployed state.

2. The on-demand thermal insulator system of claim 1, wherein the defined boundary is a wall.

3. The on-demand thermal insulator system of claim 1, wherein the body comprises:
a layer disposed between two materials, the layer configured to receive a fluid when transitioning from the non-deployed state to the deployed state.

4. The on-demand thermal insulator system of claim 3, wherein
the fluid is pressurized into the layer, and
the pressurization of the fluid into the layer is at least part of a force used to transition the body from the non-deployed state to the deployed state.

5. The on-demand thermal insulator system of claim 4, wherein another force other than the pressurization of the fluid is also used to transition the body from the non-deployed state to the deployed state.

6. The on-demand thermal insulator system of claim 3, wherein the body further comprises
a second layer disposed between the two materials, the second layer configured to receive a fluid when transitioning from the non-deployed state to the deployed state.

7. The on-demand thermal insulator system of claim 2, wherein the body is wound in a non-deployed state.

8. The on-demand thermal insulator system of claim 7, wherein the body is wound on a biased reel that at least biases toward the non-deployed state or the deployed state.

9. The on-demand thermal insulator system of claim 2, wherein the body is folded in a non-deployed state.

10. The on-demand thermal insulator system of claim 2, wherein the transparent material is glass.

11. The on-demand thermal insulator system of claim 10, wherein
the body substantially covers the glass in the deployed state, and
the body substantially allows the passage of light through the glass in a non-deployed state.

12. The on-demand thermal insulator system of claim 11, wherein the glass surface is a window.

13. The on-demand thermal insulator system of claim 11, wherein the glass surface is a wall or ceiling of a greenhouse.

14. The on-demand thermal insulator system of claim 2, wherein the body is configured for placement into walls of a collapsible tent.

15. The on-demand thermal insulator system of claim 1, wherein the body comprises:
a plurality of layered collapsible tubes, the layered collapsible tubes configured to receive a fluid when transitioning from the non-deployed state to the deployed state.

16. The on-demand thermal insulator system of claim 1, further comprising:
a second body that is configured to transition between a non-deployed state and a deployed state, the second body configured to resist the transfer of thermal energy when in the deployed state and collapse to a reduced form when in the non-deployed state, the second body positioned next to the first body, and
a third body that is configured to transition between a non-deployed state and a deployed state, the third body configured to resist the transfer of thermal energy when in the deployed state and collapse to a reduced form when in the non-deployed state, the third body positioned at an intersection of the first body and the second body to prevent a leak of thermal energy at the intersection when the first body and second body are deployed.

17. The on-demand thermal insulator system of claim 2, further comprising:
a sensor configured to measure a temperature, and
a pump in communication with the sensor, the pump configured to adjust a thickness of the layer based on the temperature.

18. The on-demand thermal insulator system of claim 2, further comprising:
a solar panel configured to receive energy from the sun,
a battery configured to store energy transferred from the solar panel,
a motor configured to provide at least a portion of a force required to transfer the body between the deployed state and the non-deployed state, and
a pump configured to provide fluid to the layer, wherein the motor and the pump receive at least a portion of their energy from sun as stored in the battery.

19. The on-demand thermal insulator system of claim 2, further comprising:
a solar panel configured to receive energy from the sun,
a battery configured to store energy transferred from the solar panel,
a motor configured to provide at least a portion of the force required to transfer the body between the deployed state and the non-deployed state, wherein the motor receives at least a portion of its energy from sun as stored in the battery, and
a pump configured to provide fluid to the layer, wherein at least a portion of fluid provided to the layer is stored as pressurized fluid based on energy received from the sun.

* * * * *